United States Patent Office 3,536,915
Patented Oct. 27, 1970

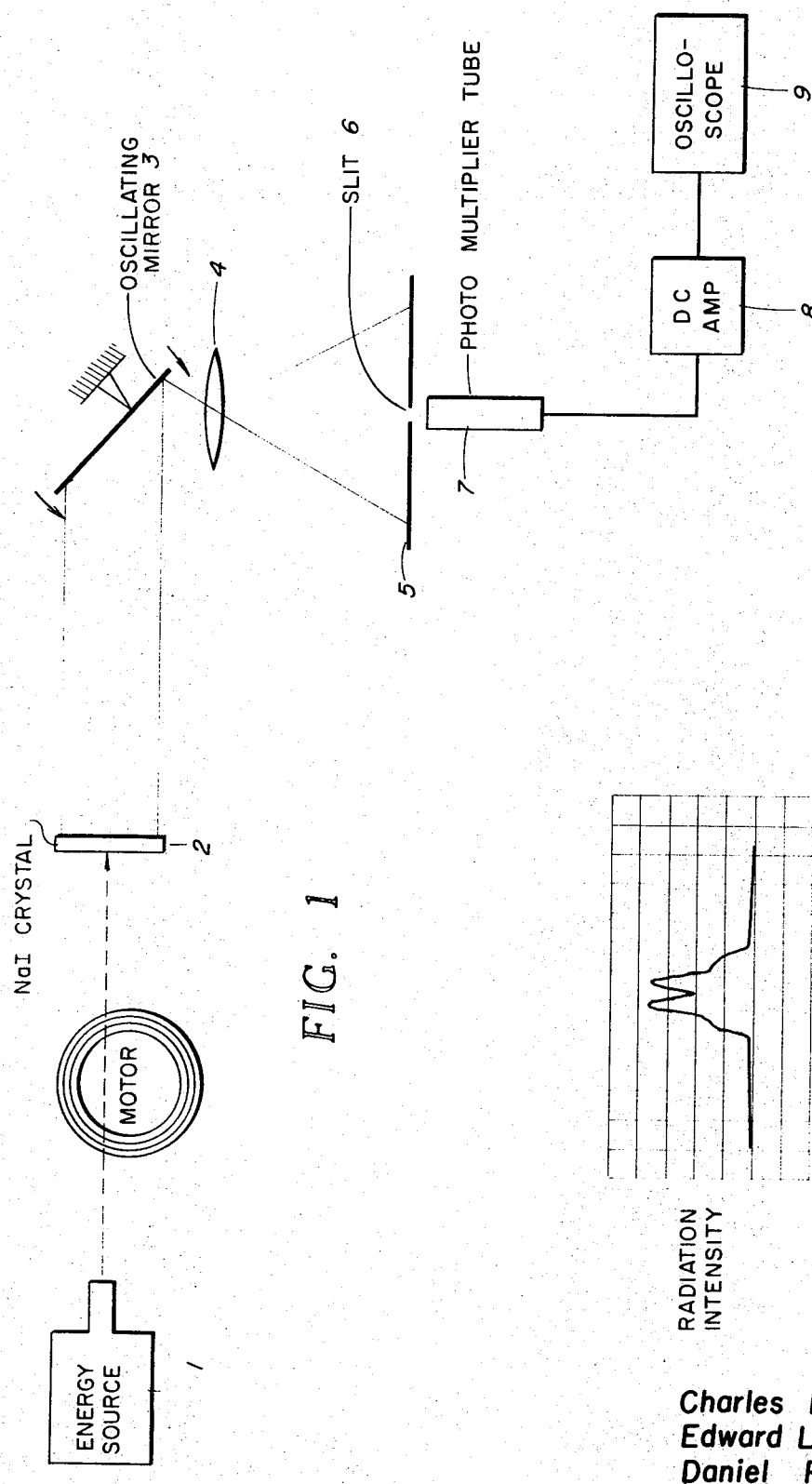

3,536,915
RADIOGRAPHIC BOND INSPECTION APPARATUS
Charles H. Dyer, Edward L. Criscuolo, and Daniel Polansky, Silver Spring, Md., assignors to the United States of America as represented by the Secretary of the Navy
Filed Mar. 12, 1968, Ser. No. 712,536
Int. Cl. G01t 1/20
U.S. Cl. 250—71.5      2 Claims

ABSTRACT OF THE DISCLOSURE

A radiation energy source penetrates a test object producing an optical image on a fluorescent detector, the image having brightness gradations related to the absorption characteristics of the test object. The detector is scanned by an oscillating mirror to direct the image across a narrow slit and a photomultiplier tube to produce an electrical output that is monitored on an oscilloscope.

BACKGROUND OF THE INVENTION

This invention relates generally to a bond inspection system, and more particularly to a system for inspecting the liner-propellant bond in solid fuel rocket motors.

The importance of the liner-propellant bond in solid fuel rocket motors has been established through correlation of nondestructive test data and motor performance. A prior art system for the detection of liner-propellant separation employs tangential radiography wherein X-rays are passed both through and outside a rocket motor and two crystal detectors are positioned, one in line with the bond to be inspected, and another in a path from the X-ray source outside the motor. Outputs from the crystal detectors are compared to provide some indication of the liner-propellant bond quality. No scanning techniques are employed in this system. This system inherently provides only a rough indication of possible bond defects.

Another prior art technique is the analysis of radiographs of the rocket motor by a microdensitometer. However, the quality of the film and the photon noise of the microdensitometer set a limit on the resolution capability of the system.

SUMMARY OF THE INVENTION

Accordingly, one object of this invention is to provide a new and improved bond inspection system.

Another object of the invention is the provision of a new and improved inspection system for liner-propellant bonds in solid-fuel rocket motors.

Still another object of the present invention is to provide a bond inspection system having improved accuracy and resolution.

Briefly, in accordance with one embodiment of this invention, these and other objects are attained by providing a penetrating radiation source of energy, and a fluorescent detector screen positioned in line with the energy source. The object to be inspected is placed in the source-detector path and an oscillating mirror and lens arrangement scans the detector output over a high resolution pickup source to provide useful information regarding the quality of interface bonds in the test object.

BRIEF DESCRIPTION OF THE DRAWING

A more complete appreciation of the invention and many of the attendant advantages thereof will be readily appreciated as the same becomes better understood by reference to the following detailed description when considered in connection with the accompanying drawings wherein:

FIG. 1 is a schematic view, partly block diagrammatical, of the overall bond inspection system according to the present invention;

FIG. 2 is a graphical view, showing the oscilloscope image of an object under test.

DESCRIPTION OF THE PREFERRED EMBODIMENT

Referring now to the drawings, and more particularly to FIG. 1 thereof, wherein the bond inspection system of the present invention is shown as including a conventional penetrating radiation energy source 1 to provide radiation which may be X-rays, gamma rays, or beta rays, for example, that are directed to a detector screen 2. Energy source 1 may be an X-ray or cobalt source, a betatron, or some other source of penetrating radiation. Detector screen 2 is chosen to be fluorescent when bombarded by the radiation source; suitable detector materials include zinc sulfide for low energy sources and sodium iodide for high energy sources. An oscillating mirror 3 provides a reflected image that is focused by a lens 4 and is scanned across a plate 5 having a narrow slit 6. Light passing through slit 6 is directed onto a photoresponsive device such as a photomultiplier tube 7 to produce a D.C. current output that is amplified by a D.C. amplifier 8. Photomultiplier tube 7 is preferably shielded from the radiation source by lead, tungsten, steel, or other suitable radiation shielding materials (not shown). A visual indicating device such as an oscilloscope 9 is connected to amplifier 8 to display a pattern representative of the density of materials under test that are positioned in the source-detector path. Alternately, an x–y plotting device or similar instrument may be employed. Also a solid state device may be used in place of a photomultiplier tube.

In operation, a test object, such as a solid fuel rocket motor, is oriented so that the energy beam is aligned tangentially along the motor edge, passing through the propellant-liner bond. The motor may be placed on a turntable to facilitate inspection of its entire circumference. The detector 2 fluoresces, producing an optical image having brightness gradations related to the absorption characteristics of the test material lying in the beam path. Optical scanning and conversion of the scanned light image to an electric signal by means of the lens, rotating mirror, slit, and photomultiplier tube allows close analysis of the detector image on the oscilloscope.

If an operating embodiment, a 90 curies cobalt 60 source was used to provide a high energy beam and the detector was a circular cylindrical sodium iodide crystal, one inch thick, located 18 to 40 inches away from the source. An f/2.8 50 mm. lens focused the reflected detector image from a plane rectangular mirror oscillating at about 2.8 sweeps/second onto a 0.020 inch slit. FIG. 2 shows an oscilloscope trace produced when the object under test was a steel plate having two 2 inch by ¼ inch slits.

It will be apparent that although the invention has been described in connection with the inspection of solid fuel rocket motors, that it is equally applicable to inspection of other physical objects to detect defects.

In addition, it will be apparent that other techniques may be employed to optically scan the detector screen 2. For example, a rotating scanning disc may be substituted for the rotating mirror and slit. If this alternative is employed, the source, screen, disc, and photomultiplier will be arranged in a substantially straight line.

It will also be apparent that an electronic scanning system may be employed, for example, by substituting an image dissector tube for the slit and photomultiplier and by providing a fixed mirror.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. Apparatus for inspecting the internal interface bonds of a solid fuel motor by radiographic energy comprising the combination of:
   a high intensity cobalt 60 source,
   a fluorescent sodium iodide crystal detector screen oriented to receive incident energy from said cobalt 60 source whereby a light image is produced on said screen,
   means for converting light energy into electrical energy comprising a photomultiplier tube, said tube having heavy metal radiation shielding,
   said means for converting further comprising a plate having a narrow slit therein, said slit oriented to allow said light image to be focused on said photomultiplier tube,
   means for scanning said light image over said converting means comprising an oscillating plane rectangular mirror and a lens arranged to focus the light image from said oscillating mirror onto said means for converting, and
   graphical plotting means for translating said electrical energy into a visual display.

2. The apparatus of claim 1:
   wherein said high intensity cobalt 60 source has a radiation output on the order of 90 curies.

References Cited
UNITED STATES PATENTS

| | | |
|---|---|---|
| 2,659,823 | 11/1953 | Vossberg. |
| 2,885,557 | 5/1959 | Kizaur. |
| 2,897,368 | 7/1959 | Lundberg et al. _____ 250—71.5 |
| 3,027,457 | 3/1962 | Mouly. |
| 3,146,350 | 8/1964 | Topfer. |

ARCHIE R. BORCHELT, Primary Examiner

U.S. Cl. X.R.

250—83.3